(12) United States Patent
White et al.

(10) Patent No.: US 7,668,777 B2
(45) Date of Patent: Feb. 23, 2010

(54) SYSTEM AND METHOD FOR PROVIDING INSTANT-DECISION, FINANCIAL NETWORK-BASED PAYMENT CARDS

(75) Inventors: Brigette A. White, Corlandt Manor, NY (US); Ronald Levinson, Tampa, FL (US); Mohit Sabharwal, New York, NY (US)

(73) Assignee: JP Morgan Chase Bank, New York, NY (US)

( * ) Notice: Subject to any disclaimer, the term of this patent is extended or adjusted under 35 U.S.C. 154(b) by 386 days.

(21) Appl. No.: 10/898,518

(22) Filed: Jul. 23, 2004

(65) Prior Publication Data
US 2005/0097036 A1      May 5, 2005

Related U.S. Application Data

(60) Provisional application No. 60/490,331, filed on Jul. 25, 2003.

(51) Int. Cl.
*G06Q 40/00* (2006.01)
*G06K 5/00* (2006.01)

(52) U.S. Cl. .................................. 705/38; 235/380
(58) Field of Classification Search ............... 705/1, 705/38, 40; 235/380; 700/92
See application file for complete search history.

(56) References Cited

U.S. PATENT DOCUMENTS

| | | |
|---|---|---|
| 3,316,395 A | 4/1967 | Lavin |
| 3,634,669 A | 1/1972 | Soumas et al. |
| 4,594,663 A | 6/1986 | Hirayama |
| 4,598,367 A | 7/1986 | DeFrancesco et al. |
| 4,642,768 A | 2/1987 | Roberts |
| 4,736,294 A | 4/1988 | Le Grand |
| 4,739,478 A | 4/1988 | Roberts et al. |
| 4,760,604 A | 7/1988 | Cooper |
| 4,812,628 A | 3/1989 | Boston |
| 4,831,526 A | 5/1989 | Luchs |
| 4,866,634 A | 9/1989 | Reboh |
| 4,897,811 A | 1/1990 | Scofield |
| 4,914,587 A | 4/1990 | Clouse |
| 4,964,043 A | 10/1990 | Galvin |

(Continued)

FOREIGN PATENT DOCUMENTS

WO     WO96/22576     7/1996

(Continued)

OTHER PUBLICATIONS

Anonymous, "Instant gratification"; Jul. 1999; vol. 12, lss. 4; Credit Card Management; pp. 1-3.*

(Continued)

*Primary Examiner*—Ella Colbert
(74) *Attorney, Agent, or Firm*—Lowenstein Sandler PC

(57) ABSTRACT

A system and method for issuance of a financial network-based payment card (generally known as a "credit card") almost instantaneously after application, wherein an applicant applies for a credit card by entering data into a data entry system, advantageously by filling in a plurality of predefined forms in a computer-based data entry system. The applicant's data is sent via a data network to a central decision center, which approves or disapproves the application. If the application is approved, data is generated and delivered to a card production system, which embosses and magnetically encodes a card blank. The card is then delivered to the applicant.

27 Claims, 15 Drawing Sheets

U.S. PATENT DOCUMENTS

| | | | |
|---|---|---|---|
| 5,054,096 A | 10/1991 | Beizer | |
| 5,206,803 A | 4/1993 | Vitagliano | |
| 5,220,500 A | 6/1993 | Baird | |
| 5,227,874 A | 7/1993 | Von Kohorn | |
| 5,231,571 A | 7/1993 | D'Agostino | |
| 5,233,547 A | 8/1993 | Kapp et al. | |
| 5,239,462 A | 8/1993 | Jones | |
| 5,262,941 A | 11/1993 | Saladin | |
| 5,274,547 A | 12/1993 | Zoffel | |
| 5,278,751 A | 1/1994 | Adiano | |
| 5,321,841 A | 6/1994 | East | |
| 5,424,938 A | 6/1995 | Wagner | |
| 5,444,844 A | 8/1995 | Inoue | |
| 5,481,647 A | 1/1996 | Brody | |
| 5,523,942 A | 6/1996 | Tyler | |
| 5,537,315 A | 7/1996 | Mitcham | |
| 5,550,734 A | 8/1996 | Tater | |
| 5,551,021 A | 8/1996 | Harada | |
| 5,606,496 A | 2/1997 | D'Agostino | |
| 5,611,052 A | 3/1997 | Dykstra et al. | 395/238 |
| 5,644,493 A | 7/1997 | Motai | |
| 5,649,116 A | 7/1997 | McCoy | |
| 5,655,085 A | 8/1997 | Ryan | |
| 5,664,115 A | 9/1997 | Fraser | |
| 5,689,649 A | 11/1997 | Altman et al. | |
| 5,696,907 A | 12/1997 | Tom | |
| 5,699,527 A | 12/1997 | Davidson | |
| 5,701,400 A | 12/1997 | Amado | |
| 5,715,402 A | 2/1998 | Popolo | |
| 5,717,865 A | 2/1998 | Stratmann | |
| 5,732,397 A | 3/1998 | DeTore | |
| 5,742,775 A | 4/1998 | King | |
| 5,758,328 A | 5/1998 | Giovannoli | |
| 5,765,144 A | 6/1998 | Larche et al. | 705/38 |
| 5,774,882 A | 6/1998 | Keen et al. | 705/38 |
| 5,774,883 A | 6/1998 | Andersen et al. | |
| 5,794,207 A | 8/1998 | Walker | |
| 5,797,133 A | 8/1998 | Jones | |
| 5,802,502 A | 9/1998 | Gell | |
| 5,809,478 A | 9/1998 | Greco | |
| 5,815,683 A | 9/1998 | Vogler | |
| 5,832,447 A | 11/1998 | Rieker | |
| 5,838,906 A | 11/1998 | Doyle | |
| 5,842,178 A | 11/1998 | Giovannoli | |
| 5,844,553 A | 12/1998 | Hao | |
| 5,845,256 A | 12/1998 | Pescitelli | |
| 5,848,427 A | 12/1998 | Hyodo | |
| 5,862,223 A | 1/1999 | Walker | |
| 5,870,721 A | 2/1999 | Norris | 705/38 |
| 5,870,723 A | 2/1999 | Pare | |
| 5,873,096 A | 2/1999 | Lim | |
| 5,875,437 A | 2/1999 | Atkins | |
| 5,878,403 A | 3/1999 | Agrawal | |
| 5,897,621 A | 4/1999 | Boesch et al. | |
| 5,899,982 A | 5/1999 | Randle | |
| 5,910,988 A | 6/1999 | Ballard | |
| 5,911,135 A | 6/1999 | Atkins | |
| 5,913,202 A | 6/1999 | Motoyama | |
| 5,918,217 A | 6/1999 | Maggioncalda | |
| 5,920,848 A | 7/1999 | Schutzer | |
| 5,926,800 A | 7/1999 | Baronowski et al. | |
| 5,930,764 A | 7/1999 | Melchione | |
| 5,930,775 A | 7/1999 | McCauley | |
| 5,930,776 A | 7/1999 | Dykstra | |
| 5,940,811 A | 8/1999 | Norris | 705/38 |
| 5,940,812 A | 8/1999 | Tengel et al. | 705/38 |
| 5,963,953 A | 10/1999 | Cram et al. | |
| 5,966,699 A | 10/1999 | Zandi | |
| 5,970,482 A | 10/1999 | Pham | |
| 5,970,483 A | 10/1999 | Evans | |
| 5,983,206 A | 11/1999 | Oppenheimer | |
| 5,987,434 A | 11/1999 | Libman | |
| 5,987,436 A | 11/1999 | Halbrook | |
| 5,991,750 A | 11/1999 | Craig | |
| 5,995,947 A | 11/1999 | Fraser | |
| 6,012,044 A | 1/2000 | Maggioncalda et al. | |
| 6,014,645 A * | 1/2000 | Cunningham | 705/38 |
| 6,014,646 A | 1/2000 | Vallee et al. | |
| 6,029,139 A | 2/2000 | Cunningham et al. | |
| 6,029,149 A | 2/2000 | Dykstra | |
| 6,032,137 A | 2/2000 | Hallard | |
| 6,055,517 A | 4/2000 | Friend et al. | |
| 6,078,905 A | 6/2000 | Pich-LeWinter | |
| 6,088,686 A | 7/2000 | Walker et al. | |
| 6,105,007 A | 8/2000 | Norris | 705/38 |
| 6,108,644 A | 8/2000 | Goldschlag et al. | |
| 6,112,190 A | 8/2000 | Fletcher et al. | |
| 6,128,603 A | 10/2000 | Dent et al. | |
| 6,134,530 A | 10/2000 | Bunting et al. | |
| 6,144,948 A | 11/2000 | Walker et al. | 705/38 |
| 6,167,383 A | 12/2000 | Henson | |
| 6,185,543 B1 | 2/2001 | Galperin et al. | |
| 6,202,053 B1 | 3/2001 | Christiansen et al. | |
| 6,208,979 B1 | 3/2001 | Sinclair | |
| 6,216,115 B1 | 4/2001 | Barrameda et al. | |
| 6,233,566 B1 | 5/2001 | Levine et al. | |
| 6,249,775 B1 | 6/2001 | Freeman et al. | |
| 6,260,026 B1 | 7/2001 | Tomida et al. | |
| 6,272,528 B1 | 8/2001 | Cullen et al. | |
| 6,311,169 B2 | 10/2001 | Duhon | |
| 6,324,524 B1 | 11/2001 | Lent et al. | 705/38 |
| 6,339,766 B1 | 1/2002 | Gephart | |
| 6,343,279 B1 | 1/2002 | Bissonette et al. | |
| 6,352,206 B1 * | 3/2002 | Ashley et al. | 235/475 |
| 6,374,230 B1 | 4/2002 | Walker et al. | |
| 6,385,594 B1 | 5/2002 | Lebda et al. | |
| 6,405,181 B2 | 6/2002 | Lent et al. | 705/38 |
| 6,422,462 B1 | 7/2002 | Cohen | 235/381 |
| 6,502,080 B1 | 12/2002 | Eichorst et al. | |
| 6,505,176 B2 | 1/2003 | DeFrancesco, Jr. et al. | |
| 6,529,187 B1 | 3/2003 | Dickelman | |
| 6,556,979 B1 | 4/2003 | Liu et al. | |
| 6,567,791 B2 | 5/2003 | Lent et al. | 705/38 |
| 6,578,761 B1 | 6/2003 | Spector | 235/380 |
| 6,587,841 B1 | 7/2003 | DeFrancesco et al. | 705/38 |
| 6,601,034 B1 | 7/2003 | Honarvar et al. | |
| 6,691,094 B1 | 2/2004 | Herschkorn | |
| 6,805,287 B2 | 10/2004 | Bishop | |
| 6,898,636 B1 | 5/2005 | Adams et al. | |
| 6,910,020 B2 | 6/2005 | Oyama et al. | |
| 2001/0011255 A1 | 8/2001 | Asay et al. | |
| 2001/0037289 A1 | 11/2001 | Mayr et al. | |
| 2001/0047313 A1 | 11/2001 | Kanai | |
| 2001/0047489 A1 | 11/2001 | Ito et al. | |
| 2002/0007341 A1 | 1/2002 | Lent et al. | 705/38 |
| 2002/0013728 A1 | 1/2002 | Wilkman | |
| 2002/0032645 A1 | 3/2002 | Nozaki et al. | |
| 2002/0038363 A1 | 3/2002 | MacLean | |
| 2002/0048369 A1 | 4/2002 | Ginter et al. | |
| 2002/0052833 A1 | 5/2002 | Lent et al. | |
| 2002/0052836 A1 | 5/2002 | Galperin et al. | |
| 2002/0052842 A1 | 5/2002 | Schuba et al. | |
| 2002/0062282 A1 | 5/2002 | Kight et al. | |
| 2002/0062285 A1 | 5/2002 | Amann et al. | |
| 2002/0069159 A1 | 6/2002 | Talbot et al. | |
| 2002/0087468 A1 | 7/2002 | Ganesan et al. | |
| 2002/0091628 A1 | 7/2002 | Kunimatsu | |
| 2002/0091635 A1 | 7/2002 | Dilip et al. | |
| 2002/0103749 A1 | 8/2002 | Agudo et al. | 705/38 |
| 2002/0123960 A1 | 9/2002 | Ericksen | |
| 2002/0184140 A1 | 12/2002 | Quaile et al. | |
| 2002/0188556 A1 | 12/2002 | Colica et al. | |
| 2003/0004866 A1 | 1/2003 | Huennekens et al. | |
| 2003/0046222 A1 | 3/2003 | Bard et al. | |

| | | | |
|---|---|---|---|
| 2003/0046223 | A1 | 3/2003 | Crawford et al. |
| 2003/0120586 | A1 | 6/2003 | Litty |
| 2003/0135448 | A1 | 7/2003 | Aguias et al. |
| 2003/0135449 | A1 | 7/2003 | Xu et al. |
| 2003/0135450 | A1 | 7/2003 | Aguais et al. |
| 2003/0140000 | A1 | 7/2003 | Lee |
| 2003/0176931 | A1 | 9/2003 | Pednault et al. |
| 2003/0195840 | A1 | 10/2003 | Xu |
| 2003/0229582 | A1 | 12/2003 | Sherman et al. |
| 2004/0030667 | A1 | 2/2004 | Xu et al. |
| 2004/0044615 | A1 | 3/2004 | Xue et al. |
| 2004/0223476 | A1* | 11/2004 | Jose et al. .................. 370/338 |
| 2005/0096950 | A1 | 5/2005 | Caplan et al. |
| 2005/0097036 | A1 | 5/2005 | White et al. |

FOREIGN PATENT DOCUMENTS

WO          WO02/03226          1/2002

OTHER PUBLICATIONS

Ukraine; Banking and Finance Report; Jun. 25, 2003, Wednesday; pp. 1 and 2.*
Anonymous; Car Loans in Minutes, Bank Management, vol. 64, No. 4, Apr. 1, 1993.
Automated Capture for Forms & Documents, Cardiff Teleform Elite, Copyright 1991-2000; www.cardiff.com.
Credit Line Optimization, A Marketswitch Paper, Marketswitch Corporation, www.marketswitch.com, Copyright 2002, 6 Pages.
Paradi et al.; Using DEA and Negative DEA in Credit Risk Evaluation, Journal of Productivity Analysis, vol. 21, 2004, pp. 1-22.
Banasiak; Integrating Predictive Scoring Technology, 12th Annual Credit Card Collections Conference; Oct. 15, 2003-Oct. 17, 2003.
Scorex Launches New Credit Line Optimization Consulting Service, Scorex, Press Release, Oct. 27, 2003.
Hubbard et al.; Nextgen FICO Scores: More Predictive Power in Account Management, A Fair Isaac Paper, Sep. 1, 2001.
Triad Adaptive Control System-Version 7, Fair Isaac, Copyright 2003, Jun. 25, 2005.
Strategy Science Executive Brief, Fair Isaac, Copyright Jun. 2003, Jun. 1, 2003.
Credit Score Accuracy and Implications for Consumers, Consumer Federation of America National Credit Rep, Dec. 17, 2002.
Naesb-Suis Creditworthiness Principles Draft #1, Naesb-Suis, Dec. 9, 2002.
Hickman et al.; An Evolutionary Leap in Credit Portfolio Risk Modeling, Dec. 18, 2002.
Rusnak, Raymond; Subprime Auto Finance, What's the Fuss?, What's the Future, A Credit Perspective, the Journal of Lending & Credit Risk Management, pp. L23-30, Apr. 1997.
Raines Calls for Open System With Lender Access With Multiple Automated Underwriting Systems; Pledges to Waive Du Fees on Market Expansion Products; Announces Partnership With MBA on Technology, Lender Profitability Issues, Business Editors, Business Wire'; Apr. 19, 1999.
E-Aid Office 2000: Financial Aid Software Selection, Implementation, and Operation, Copyright 2000 by the National Association of Student Financial Aid Administrators, Jun. 2000, No. 12, pp. 1-29.
Tebbe, Mark; If Bankers Can Use the Internet to Make Big Bucks, Why Can't You?, (Between the Lines), Sep. 29, 1997, Infoworld, vol. 19, No. 39, p. 152.
Corporate EFT Report, Internet Promises Lower Cost Loan Syndications Intralink Replaces Paper With Online Access, Nov. 12, 1997, vol. 17, Issue 21, Phillips Business Information.
CFO Alert, New Medium Brewing for Syndications, Mar. 23, 1998, vol. 5, No. 121, ISSN: 0894-4822.

* cited by examiner

2. ABOUT YOU

Social Security Number 444 - 44 - 4444 *

Date of Birth (mm/dd/yyyy) 12 ▾ 31 ▾ 1888 *

Home Phone 555 - 555 - 5555 *

Mother's Maiden Name MrsHulk *

Number of Dependents ▾

Do you Currently ⊙ Own ○ Rent ⊙ Other

Length at Current Address: ▾ Years ▾ Months

[On-screen keyboard: Q W E R T Y U I O P / BACKSP A S D F G H J K L , / SPACE / Z X C V B N M . / TAB / 7 8 9 / 4 5 6 / 1 2 3 / 0 - . / Go Back / NEXT / Clear Ap / # /]

Fields marked with an asterisk (*) are required.

SYSTEM AND METHOD FOR PROVIDING INSTANT-DECISION, FINANCIAL NETWORK-BASED PAYMENT CARDS

CROSS-REFERENCE TO RELATED APPLICATION

This application claims the benefit of U.S. Provisional Application No. 60/490,331, filed Jul. 25, 2003, the entire disclosure of which is hereby incorporated herein by reference.

FIELD OF THE INVENTION

This invention relates to the field of financial network-based payment cards (e.g., credit cards, debit cards, etc.), and, more specifically, to a system and method that makes the time period from application to card issuance practically instantaneous.

BACKGROUND OF THE INVENTION

Network based payment card companies (e.g., MasterCard, Visa, American Express, etc.) are constantly soliciting applicants for their credit cards. Many of these solicitations take place in the form of mail or telephone. Such solicitations are frequently discarded or blocked so that the potential applicant does not even see or hear about the card.

On the other hand, there are many situations in which a person is more likely to participate in a credit card solicitation. For example, people waiting in line at theme parks, sport events, etc. may be more inclined to listen to a credit card solicitation and apply while they are waiting on line. Such application generally consists of the applicant filling out a form and having the solicitor send it to a possessing center. Generally however, applicants may be more inclined to apply if the credit card could be supplied virtually instantaneously.

Therefore there is a problem in that obtaining a credit card from application to delivery cannot be done where the applicant is most likely to apply.

SUMMARY OF THE INVENTION

This invention provides a system and method for issuance of a financial network based payment card (generally known as a "credit card") almost instantaneously after application. According to an aspect of this invention, an applicant applies for a credit card by entering data into a data entry system, advantageously by filling in a plurality of predefined forms in a computer-based data entry system.

Advantageously, the computer-based data entry system is handheld, so that an applicant can hold the device in one hand and enter data with the other. Also advantageously, the computer-based data entry system communicates with a local area network using wireless communication protocols such as Wi-Fi, Bluetooth, etc. The applicant's data may be encrypted before transmission for security.

The data entered by the applicant may be cross-referenced to a government-issued identification (e.g., a driver's license or passport), another credit card, or both. The applicant's data is then delivered to a decision system via a data network. The decision system indicates approval, disapproval or a pending decision. The decision and other information are relayed into a fulfillment center, which may be on-site at the place of data entry. If disapproved, the applicant is not notified on-site, but rather at a later date. In addition, before the information is displayed at the fulfillment center, the disapproval decision may be converted to a pending decision to protect the applicant's privacy, among other things. Pending decision means further review must be conducted. Further review generally is conducted at a site different from the fulfillment center.

If the application is approved, information regarding a credit card is delivered to an on-site card production system. The on-site card production system produces a credit card, which includes an embossed credit card number (which may be a temporary number) and any data magnetically encoded on it. This card can then be utilized on the various network point-of-sale networks (e.g., MasterCard, Visa, American Express). The fulfillment center verifies the applicant's identification information and delivers the card to the applicant. The card may be a permanent card that can be used anywhere the issuing association of the card, such as MasterCard or VISA, is accepted. Alternatively, the card may be limited in use to the on-site merchant (e.g., a theme park) and may be limited in time. If the card is so limited, a final card may be mailed to the applicant.

This process has proven to provide high data accuracy and high customer participation.

BRIEF DESCRIPTION OF THE DRAWINGS

A more complete understanding of this invention may be obtained from a study of this specification taken in conjunction with the drawings, in which:

FIGS. 3-13 are exemplary screen shots of data entry screens for an exemplary data entry system according to one aspect of this invention.

DETAILED DESCRIPTION

Figure 1:
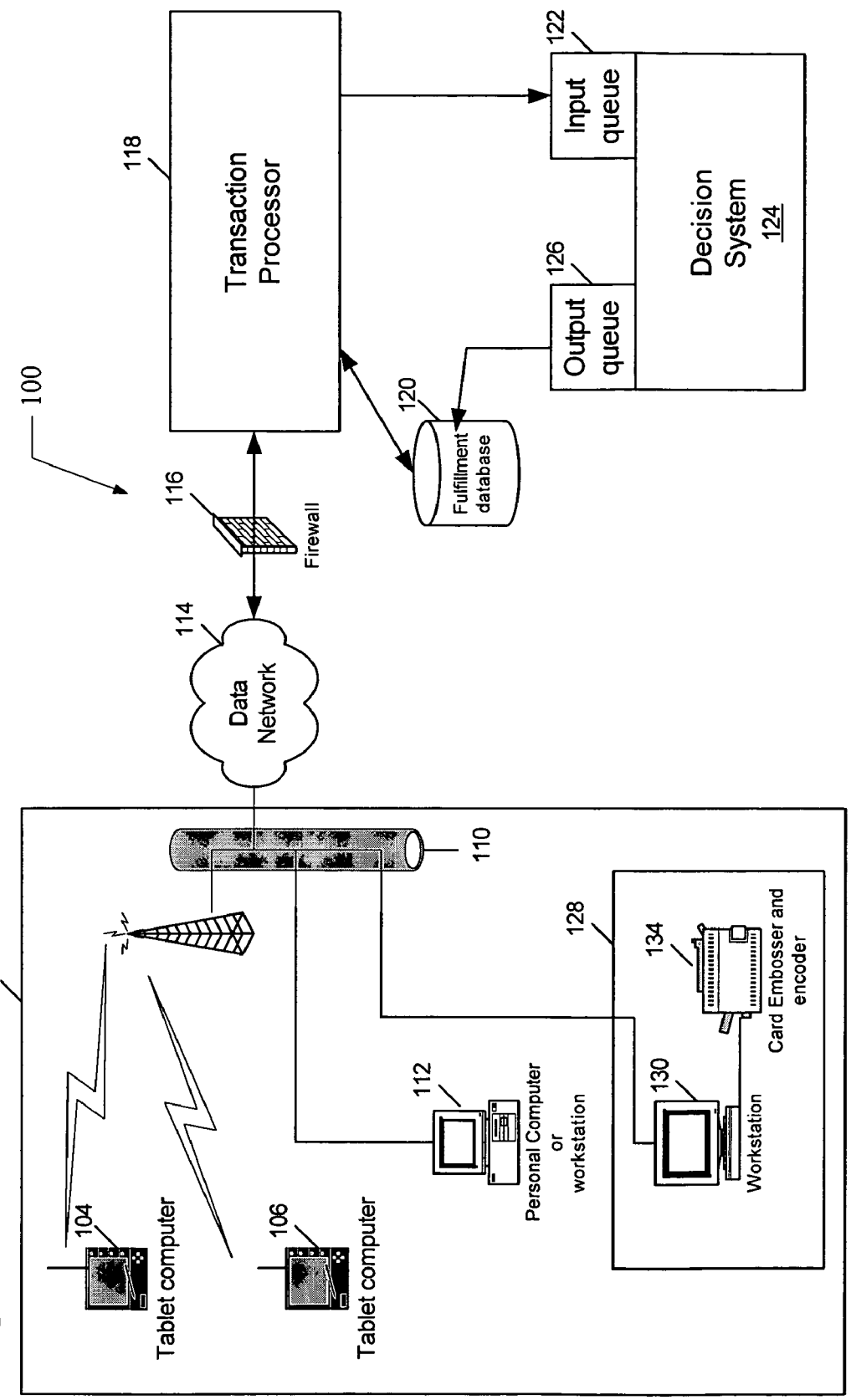
FIG. 1 is a block diagram of an exemplary embodiment of this invention.

Turning now to FIG. 1, a block diagram illustrating an exemplary embodiment of this invention is shown, generally at 100. Box 102 represents an on-site data collection and fulfillment center. On-site center 102, may be, for example, at a theme park. While this exemplary embodiment is described in the context of theme park, this invention is not so limited. On-site center 102 may be an office in a strip mall, a fair, sporting event or other location. One skilled in the art will appreciate the versatility of this invention and the many situations in which this invention may be used.

At on-site center 102, there are a plurality of tablet computers, represented by tablet computer 104 and tablet computer 106. Tablet computers 104 and 106 are used for gathering data regarding an applicant as will be discussed further, below. Tablet computers 104 and 106 are in communication with wireless network 108, in this exemplary embodiment. Wireless network 108 is in communication with local area network 110 at the on-site location 102.

An applicant enters his or her personal data in tablet computer 104 or 106, as will be described further, below in connection with FIGS. 3-13. The data is advantageously encrypted and then transmitted via wireless network 108 to local area network 110 within the theme park and eventually to a decision system 124 as described below.

Alternatively, an applicant can enter data at a personal computer or work station 112 using a keyboard in the manner known in the art. Also alternatively, an individual may fill out a paper application and hand it to a person on-site working at personal computer 112. Furthermore, all forms of entering data may take place simultaneously.

Applicant's personal data is then routed from local area network 110 through data network 114. In this exemplary embodiment, data network 114 comprises the Internet. While this exemplary embodiment of this invention is being described in terms of the Internet, one skilled in the art will appreciate how to practice this invention using any data network, public or private, after studying this specification.

Once the applicant's personal data arrives at a processing center, it passes through a firewall 116, as is known in the art. Transaction processor 118 receives the applicant's personal data, decrypts it as necessary and optionally checks it for integrity. If the data passes the integrity check, it is entered into a fulfillment database 120. Fulfillment database 120 tracks the progress of the transaction and can be accessed by personnel involved in the application process.

Transaction processor 118 submits the applicant's personal data to an input queue 122 of a decision system 124. Decision system 124 makes a determination as to whether or not to approve the applicant. An example of a decision system is the Capstone Decision System. However, one skilled in the art will appreciate that the invention is not limited to this type of decision system. Fraud screeners (not shown) may be used to review the applicant's data for potential fraud issues prior to finalizing the determination of the decision system 124. When decisions system 124 is finished, it places the decision on output queue 126 which then updates fulfillment database 120.

Transaction processor 118 is notified by fulfillment database 120 when the decision system 124 has completed. Alternatively, transaction processor 118 may periodically query fulfillment database 120 to determine whether a particular applicant has been approved.

In this exemplary embodiment of this invention, decision system 124 may approve an applicant, may disapprove an applicant or may mark the application as pending meaning further review is necessary. Such further review is generally performed at a later time. Transaction processor 118 receives the approval, disapproval or pending status and reacts accordingly. In accordance with this exemplary embodiment, transaction processor 118 delivers an approval along with the data necessary to imprint and encode a credit card (credit card numbers, etc.) back through data network 114 to local area network 110. If the decision was disapproval or pending, transaction processor 118 sends that information back through data network 114 without card data. The approval, disapproval, or pending decision may be transmitted back to the appropriate input device 104, 106, or 112 to give the applicant an immediate response.

Return data from the transaction processor 118 arrives at card fulfillment center 128. Card fulfillment center 128, in this exemplary embodiment, includes workstation 130 and card embosser and encoder 134. Work station 130 receives applicant's card information (if the applicant was approved) or pending status. If the applicant was approved, work station 130 causes card embosser and encoder 134 to generate an embossed and encoded credit card. The applicant presents identification at the fulfillment center 128. The card may be activated at work station 130 and delivered to the applicant. Alternatively, the applicant may first present his or her identification and then the card is made. This order of steps has the advantage of not printing cards if an applicant changes his or her mind. In addition to providing the applicant with a payment card, the applicant may also be provided credit line and annual percentage rate ("APR") information.

In accordance with one aspect of this invention, the credit card may be fully operationally at any network point of sale for the particular network-based payment card (e.g., Master-Card, Visa, American Express, etc). Alternatively, the card may be only valid at the on-site location 102 where the card was issued (again, such as a theme park). Further, the card may be limited for a predetermined duration and then a permanent card sent to the applicant via the mail. Additionally, the card may be temporarily limited in an amount that my be charged.

An experimental system in accordance with this invention can have a credit card ready in less than five minutes from application to card imprinting. Having the credit card available where the application was taken has been demonstrated to improve willingness of applicants to apply. Thus, the combination of speed and local availability of the credit card provides great advantages over the prior art.

Figure 2A:
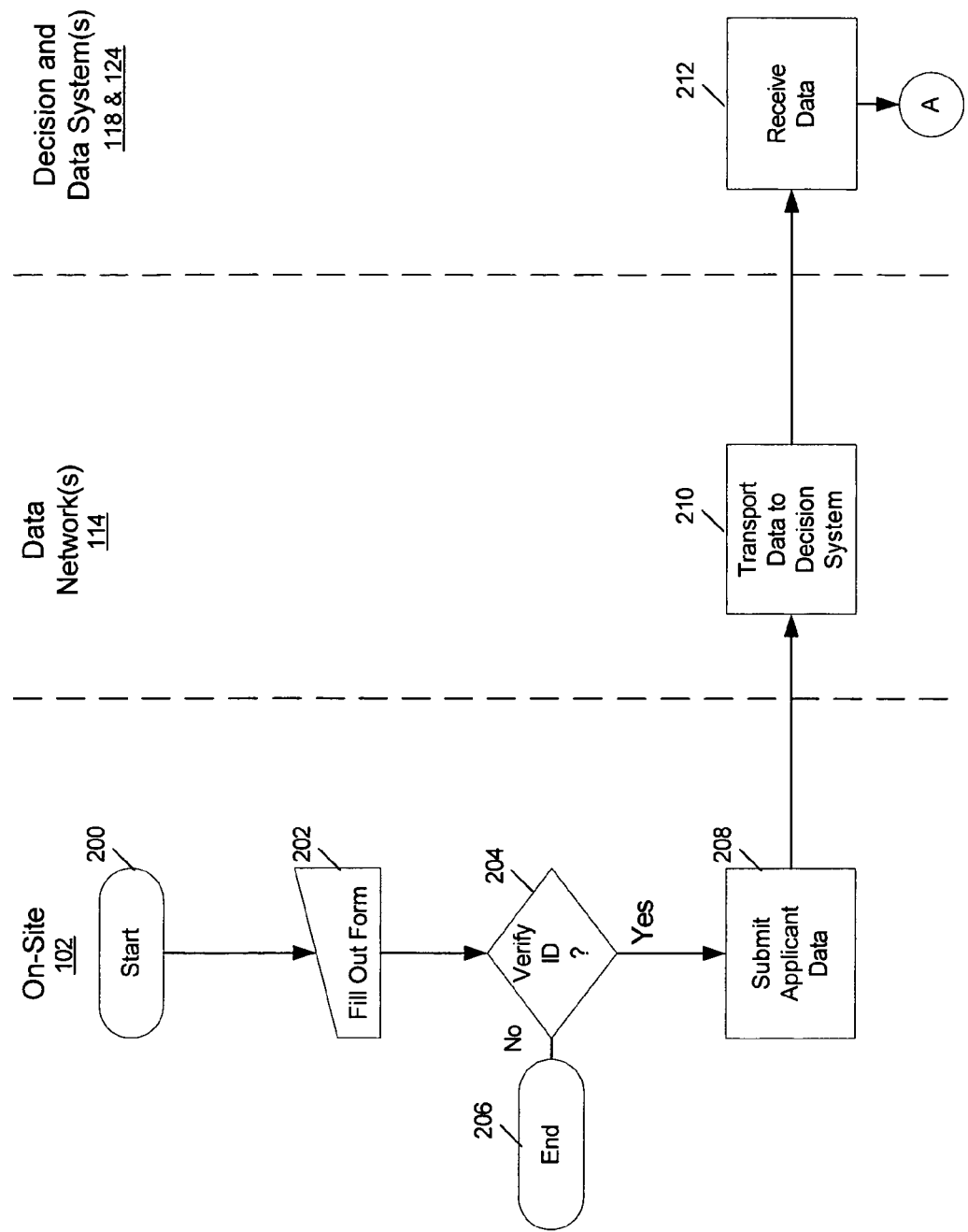
FIGS. 2a-c are a flow chart of processing a credit card application in the context of FIG. 1.
Figure 2B:
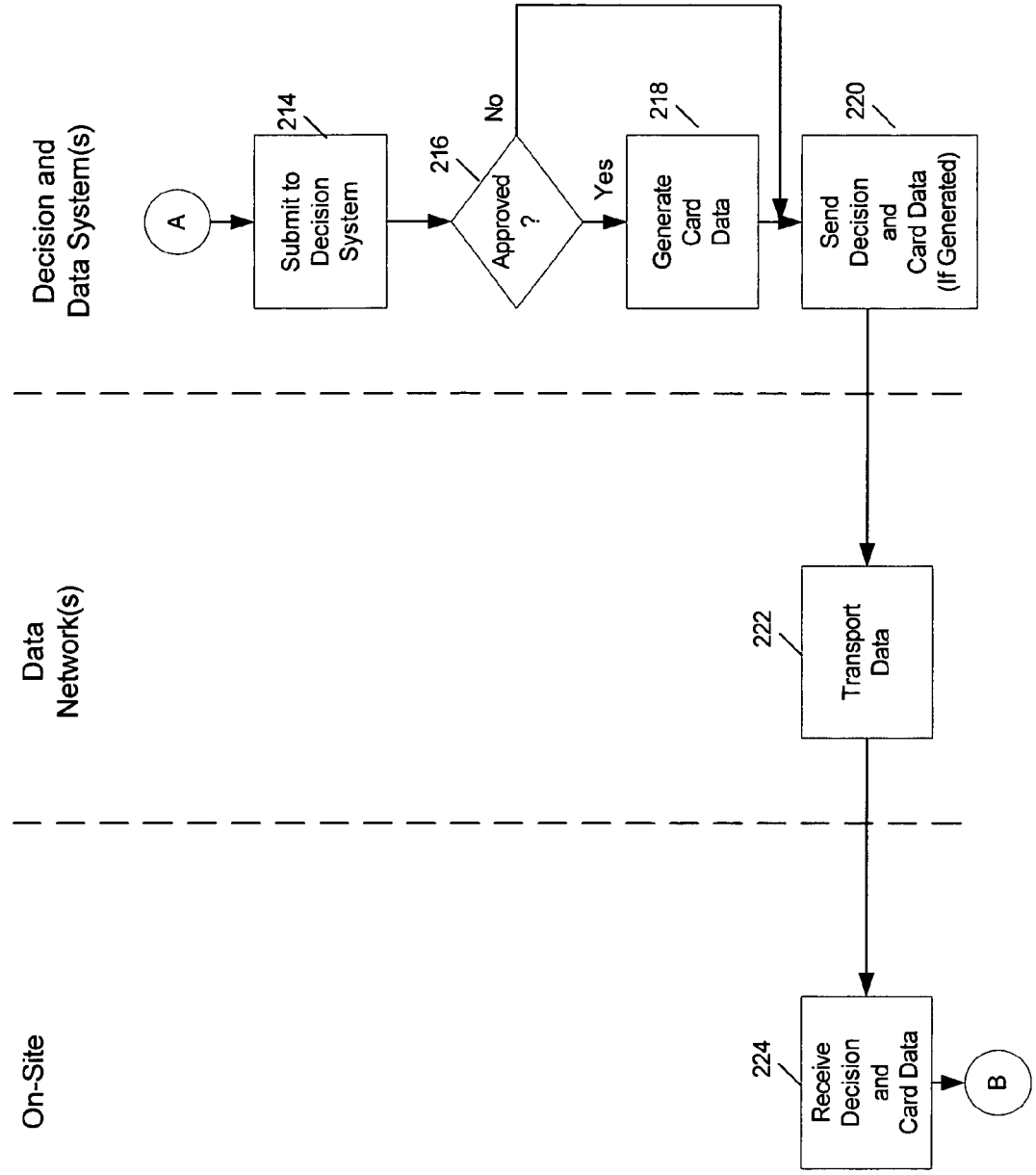
Figure 2C:
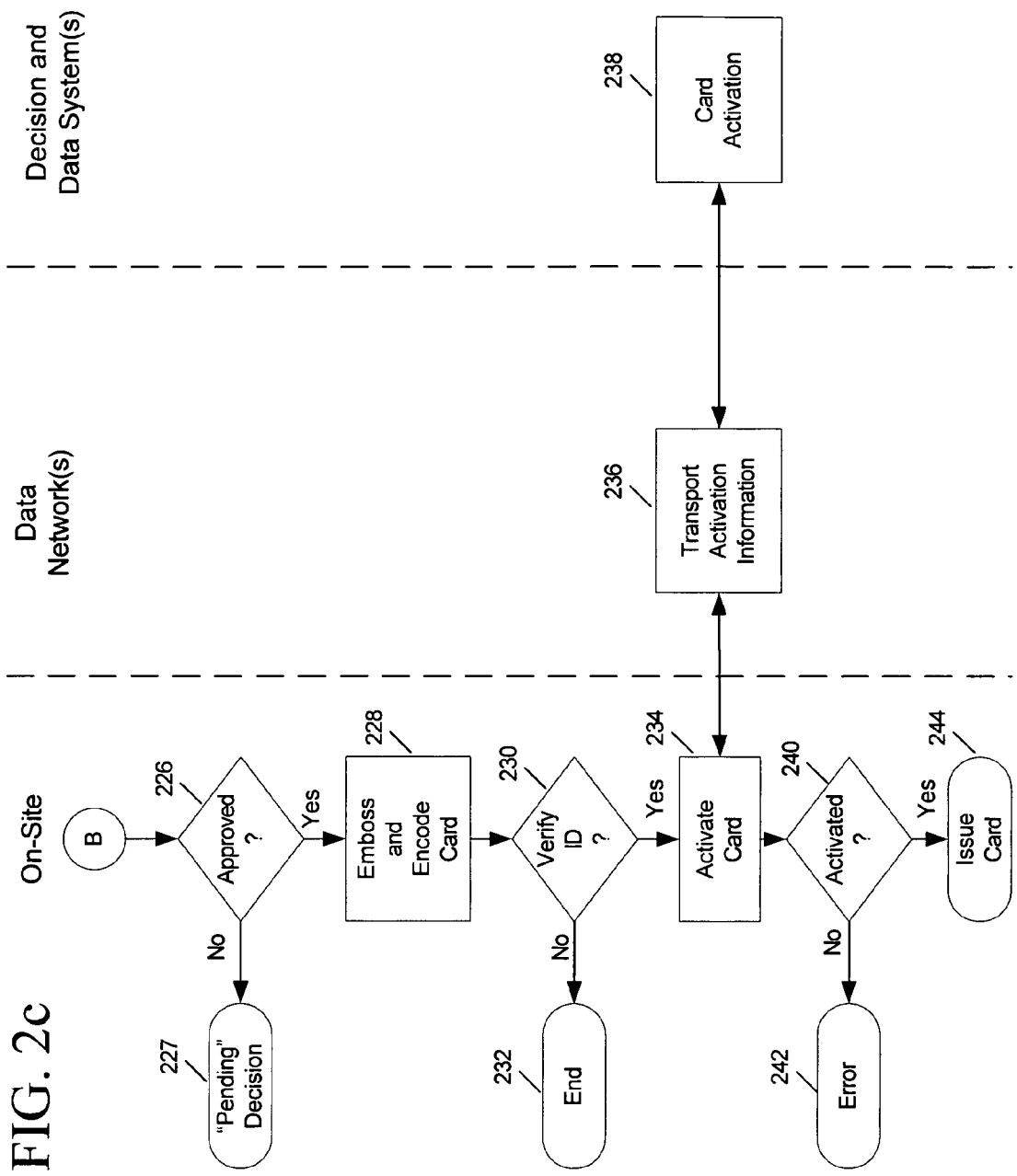

Turning now to FIG. 2*a*-*c*, a flow of operations of an exemplary embodiment of this invention is shown. In this flow chart, actions take place on-site 102, in data networks 110 and 114 and in decision and data systems 118 and 124. Processing starts on-site 102 in oval 200 and proceeds to manual input 202 where the applicant fills out forms. Processing moves to decision diamond 204 where the applicant's identification is verified. If the applicant cannot verify his or her ID, processing ends in oval 206.

If the applicant verifies his or her ID, then processing moves to action box 208 where the application is submitted. Processing then moves through data networks 110 and 114 as the applicant's personal data is transported to decision system in box 210. Decision and data systems 118 and 124 receive applicant's personal data in box 212 and performs any data verification and updates the database. Processing continues from FIG. 2*a* to FIG. 2*b* via connector A.

Turning now to FIG. 2*b* processing enters through connector A and then proceeds to action box 214 where the applicant's personal data is submitted to a decision system. Processing moves to decision diamond 216 where determination is made if the application has been approved. If the application has been approved, then processing moves to action box 218 where card data is generated. In this exemplary embodiment, card data includes any embossed data account information and, importantly, data for the magnetized card strip.

Processing from action box 218 and from decision diamond 216 (if the application was not approved) moves to action box 220 where the decision and card data (if generated) is sent back to the on-site location. The decision is sent through data networks 114 and 110 in box 222 and received at the on-site location in box 224. Processing proceeds through connector B to decision diamond 226, FIG. 2*c*. Continuing with FIG. 2*c*, a determination is made in decision diamond 226 whether the application has been approved. If the application has not been approved then the applicant is informed that the status is pending further review at 227. If the applicant was approved at decision diamond 226, then processing proceeds to box 228 where a card is embossed and encoded. Processing proceeds to decision diamond 230 where the applicants identification is verified. If an applicant cannot verify his or her identification then processing ends in oval 232.

If, in decision diamond 230, the applicant verifies his or her ID then the card may be activated in box 234. A message may be sent through data networks in box 236 to system inbox 238 and activation confirmation delivered back through data networks box 236 to box 234. A determination is then made in decision diamond 240 whether the card was successfully activated. If the card was not successfully activated then an error code is delivered. If the card was successfully activated then a card is issued to the applicant in oval 244.

Figure 3:
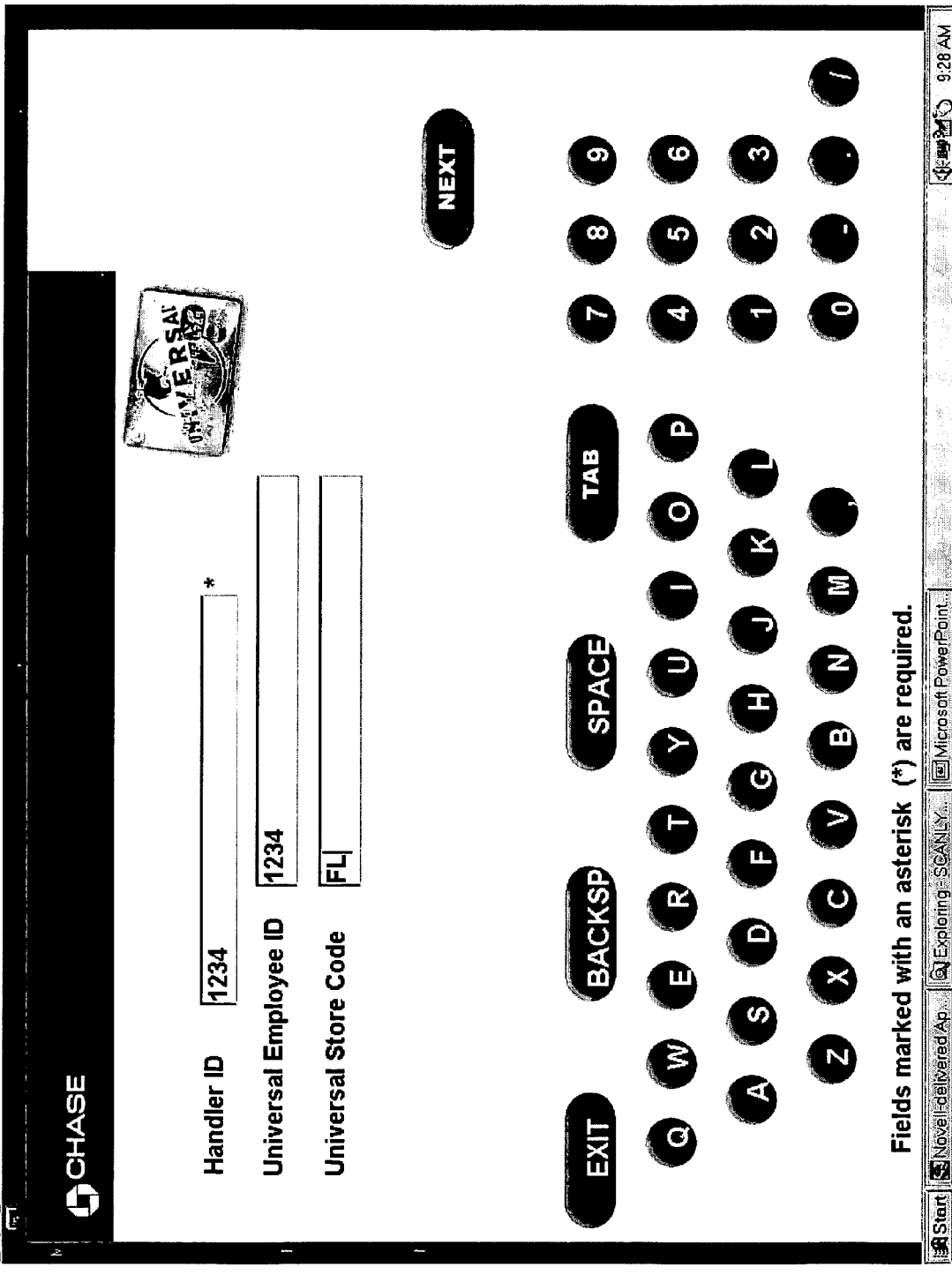

FIGS. 3-13 illustrate exemplary embodiments of data entry screens in tablet computers 104 and 106. Tablet computers are desirable in this application because they can be held in one hand while the applicant enters data with the other. Input may be via a touch screen or a stylus. A personal digital assisted device, laptop computer, or other computer device (with or without wireless capacity) could also be used. One skilled in the art will appreciate that any input device that is appropriate for the environment in which it will operate may be used. FIG. 3 illustrates an exemplary log in screen for an applicant. A person soliciting card applications (herein called "a handler") enters his or her own identification and location information. In the screen of FIG. 4, the handler enters identification information of the applicant, such as driver's license and existing credit card, and verifies that he or she has seen the photo identification.

Figure 5:
Figure 7:
Figure 8:
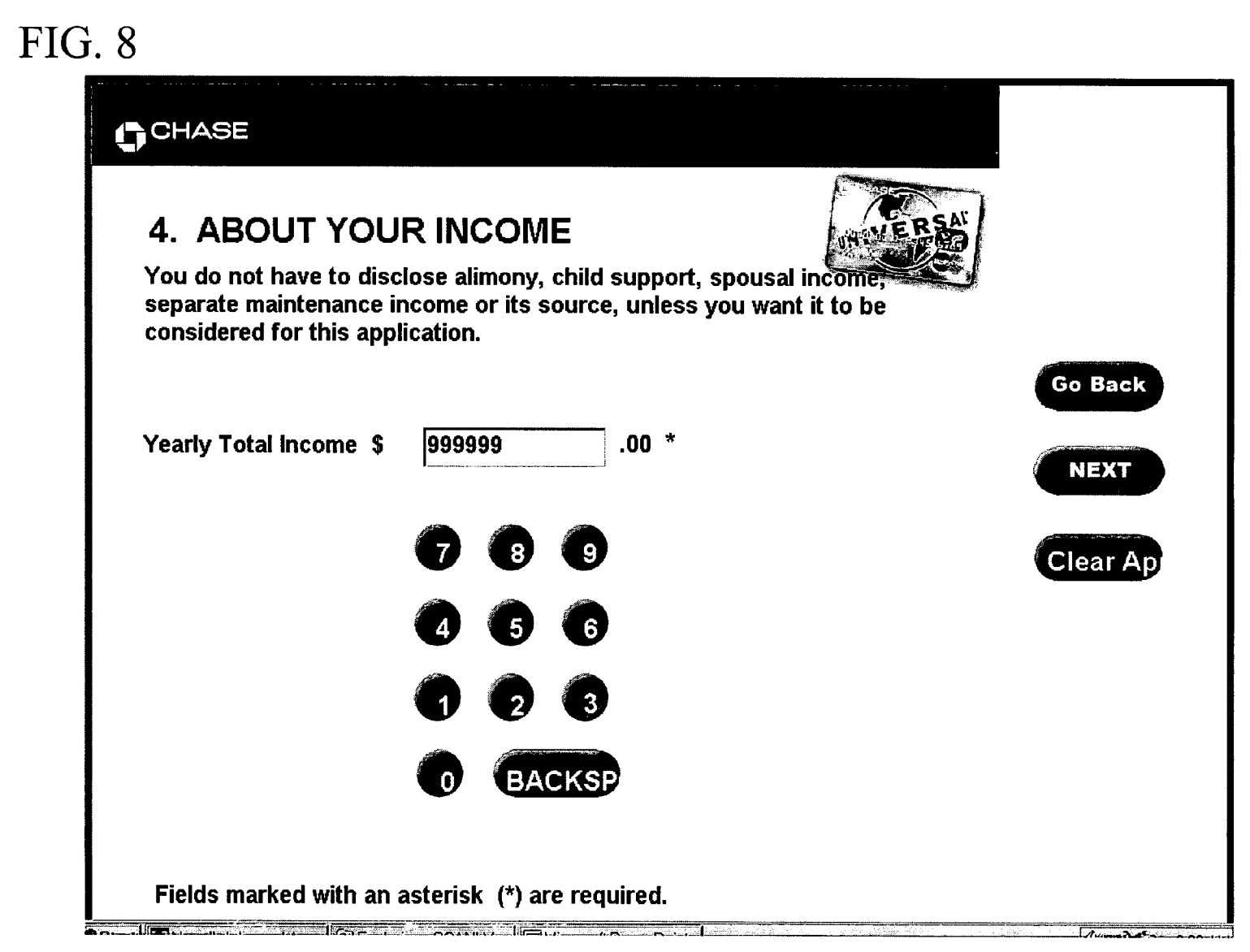
Figure 9:
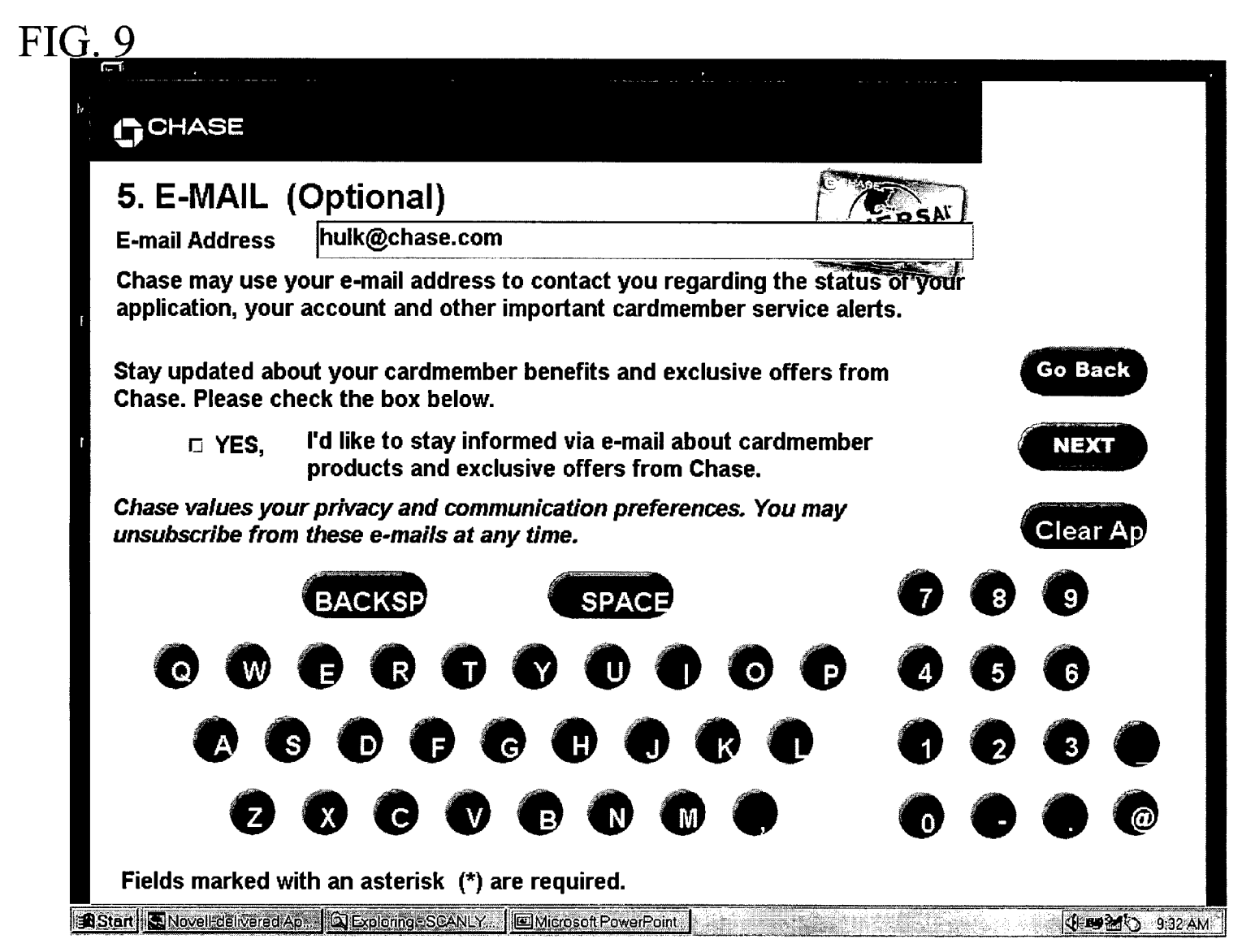

In the screens of FIGS. 5-9, additional information about the applicant is entered. Not all data entry fields shown in these figures are required, but some are, such as the applicant's social security number. In the screen of FIG. 5, the applicant fills out his or her name and address. In the screen of FIG. 6, the applicant fills out information such as social security number, date of birth, phone number and identification such as mother's maiden name. In the screen of FIG. 7, the applicant is asked for employment information and in FIG. 8 enters income. In the screen FIG. 9, the applicant may optionally enter an e-mail address in order to receive information regarding card member products.

Figure 10:
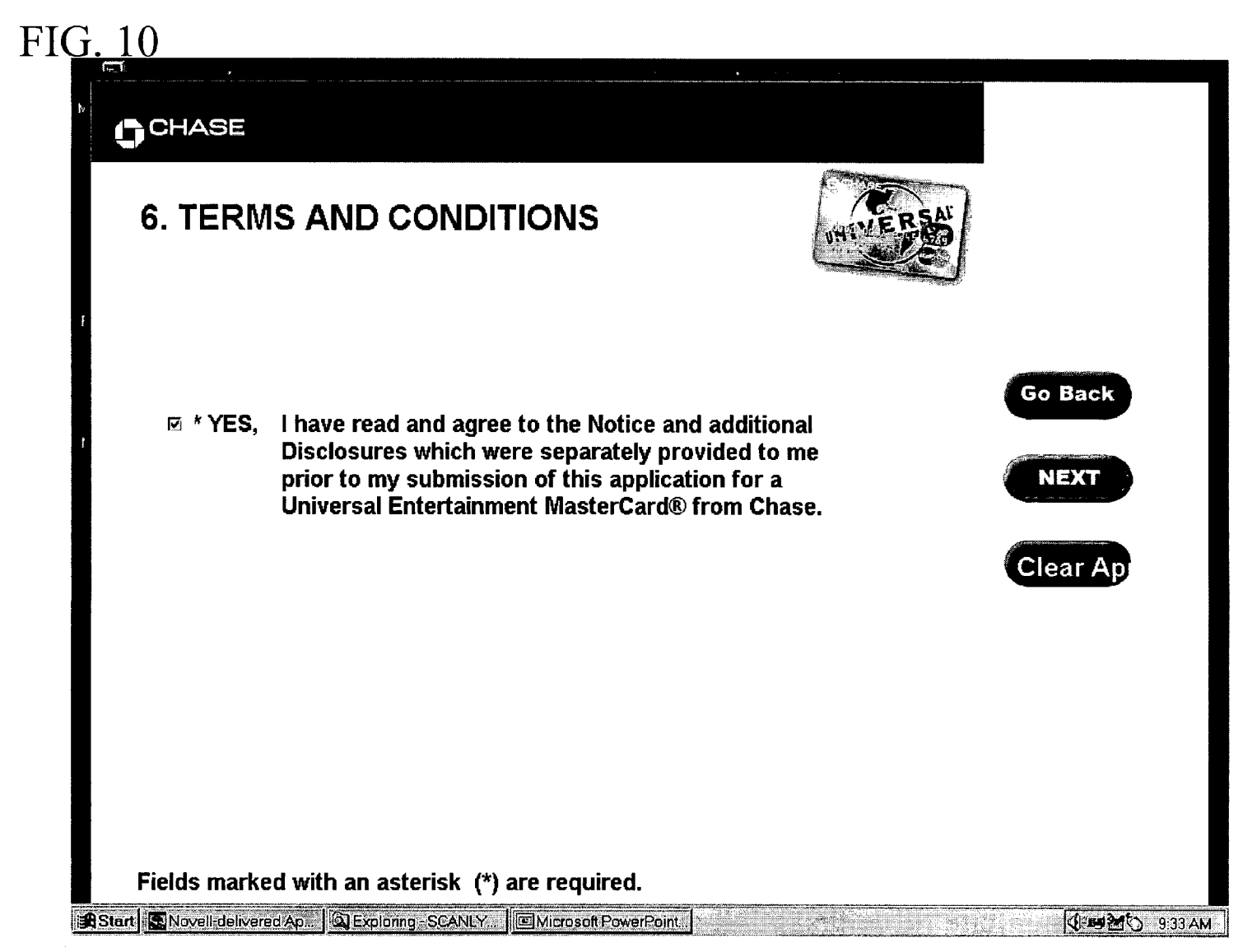
Figure 11:
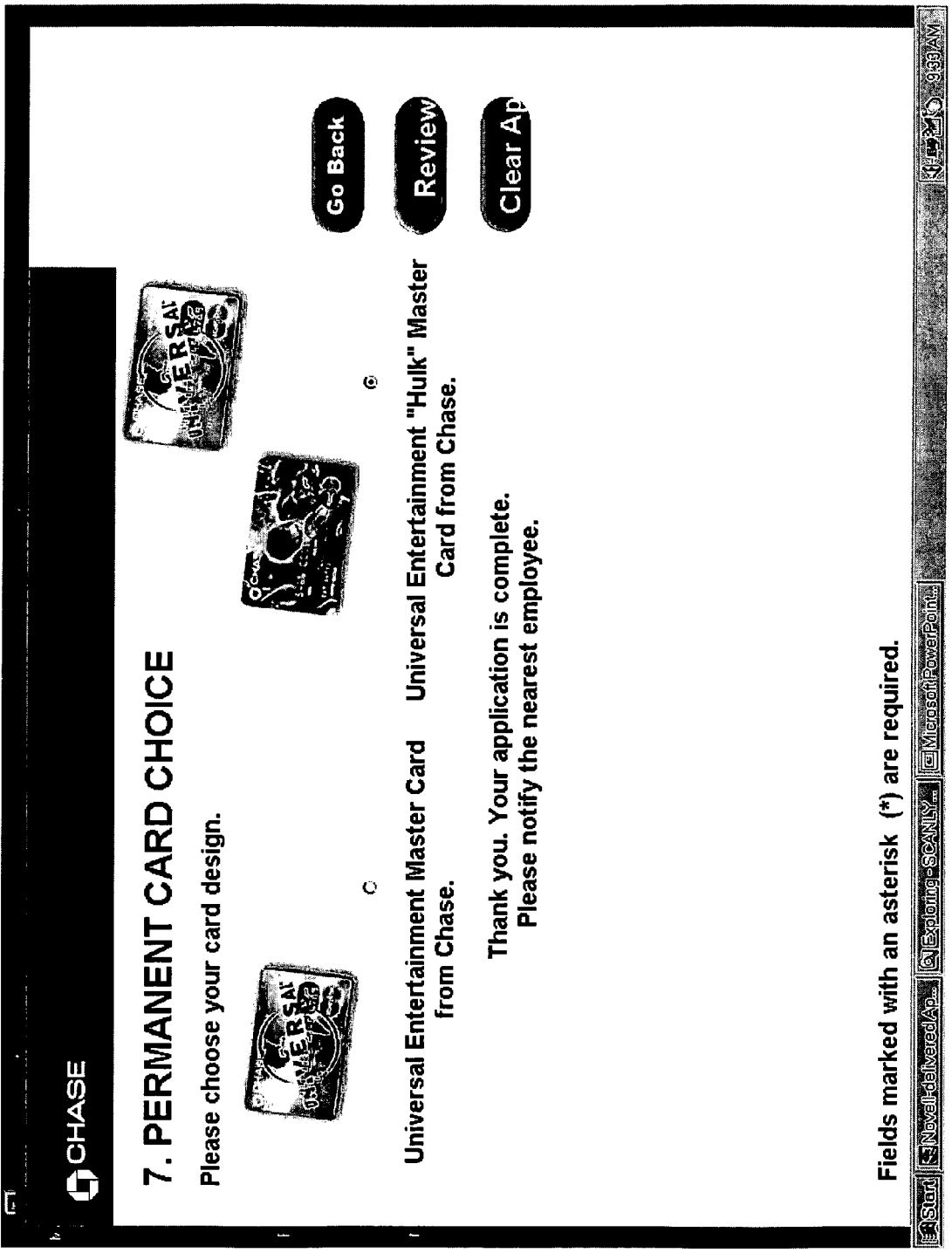
Figure 12:
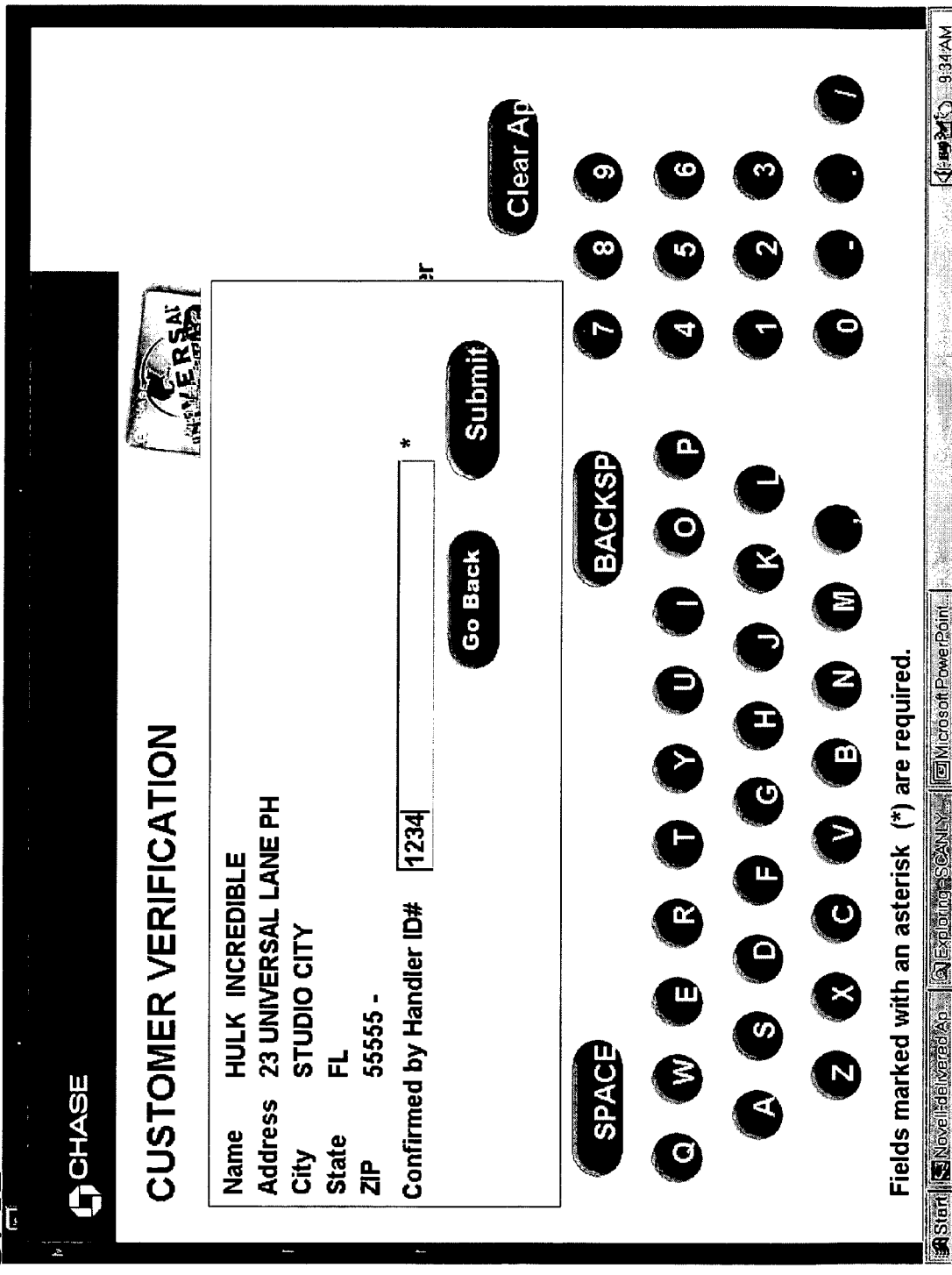
Figure 13:
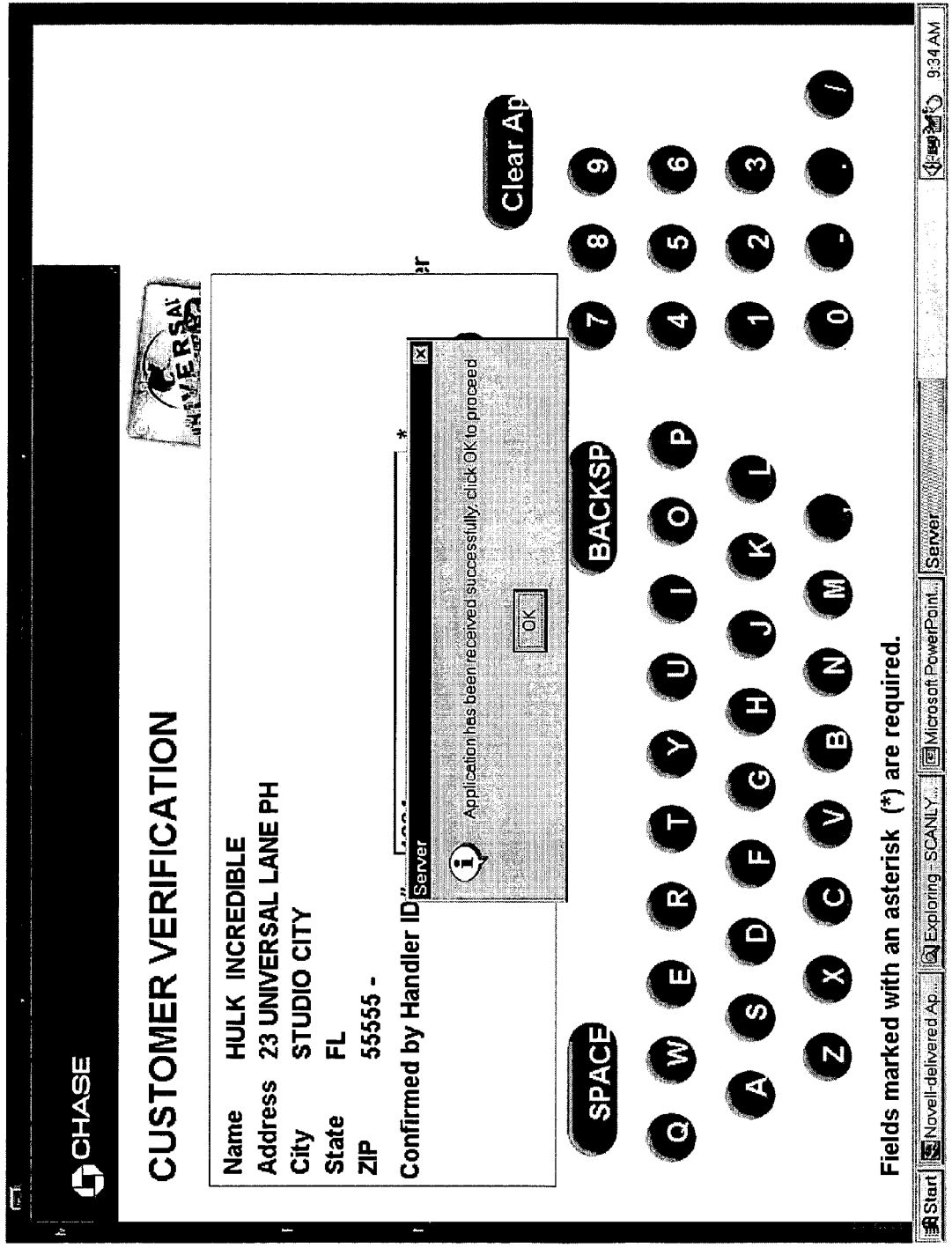

Terms and conditions are agreed to in the screen of FIG. 10. In the screen of FIG. 11, the applicant selects one of a choice of credit card designs. The handler, in the screen of FIG. 12, again verifies the applicant's information and enters the handler's own identification information.

It is to be understood that the above-described embodiment is merely illustrative of the present invention and that many variations of the above-described embodiments can be devised by one skilled in the art without departing from the scope of the following claims and their equivalents.

What is claimed is:

1. A computer-implemented method for issuing a payment card, comprising the steps of:
   receiving, at a first site, personal data from an applicant located at the first site;
   sending the personal data from the first site to a decision system;
   determining at the decision system, whether to issue the payment card based on information comprising the personal data and financial information regarding the applicant;
   sending unique identifying information to an imprinting device located at the first site, responsive to a determination to issue the payment card to the applicant;
   imprinting, at the first site, a blank payment card with the unique identifying information;
   activating the payment card for use in a limited geographic area comprising the first site; and
   issuing the payment card to the applicant at the first site.

2. The computer-implemented method of claim 1 wherein the financial information regarding the applicant comprises a credit score and the determining is based on information further comprising a result of a fraud screening.

3. The computer-implemented method of claim 1 wherein the determining results in a decision, and the method further comprises: sending the decision to a database that is accessible to personnel involved with issuing the payment card to the applicant.

4. The computer-implemented method of claim 1 further comprising:
   providing a credit line and annual percentage rate information to the applicant.

5. The computer-implemented of claim 1 further comprising: activating the payment card for use at a single merchant located at the first site.

6. The computer-implemented method of claim 1 wherein the personal data is received from the applicant via an interactive electronic device.

7. The computer-implemented method of claim 6 further comprising: sending a result of the decision system to the interactive electronic device.

8. The computer-implemented method of claim 6 wherein the interactive electronic device communicates wirelessly and wherein sending the personal data comprises: communicating personal data between the interactive electronic device and a first wireless network and forwarding the personal data through said wireless network to the decision system.

9. The computer-implemented method of claim 1 wherein imprinting the blank card with the unique identifying information further comprises: encoding at least a portion of said information on a machine readable strip.

10. The computer-implemented method of claim 1 wherein the payment card is a temporary payment card.

11. The computer-implemented method of claim 10 further comprising the step of conducting further evaluation of the applicant to determine whether to issue a permanent payment card.

12. The computer-implemented method of claim 11 wherein based on a determination to issue the permanent payment card, the temporary payment card is changed into the permanent payment card.

13. The computer-implemented method of claim 11 wherein based on a determination to issue the permanent payment card, the temporary payment card is replaced by the permanent payment card.

14. A system for issuing a payment card accepted by one or more financial networks comprising:
   an input device located at a first site configured to receive personal data from an applicant located at the first site;
   a decision system configured to:
   receive the personal data from the input device,
   determine credit worthiness of the applicant based upon at least the personal data, and
   generate credit card information responsive to determining that the applicant is credit worthy;
   a data network communicatively connecting the input device and the decision system, and
   a card encoding system located at the first site and communicatively connected to the data network, the card encoding system configured to receive credit card information from the decision system and to generate a payment card having the credit card information, for issuance of the payment card to the applicant at the first site,
   wherein the payment card is activated for use in a limited geographic area comprising the first site.

15. The system of claim 14 wherein said input device comprises a tablet computer system.

16. The system of claim 14 wherein said input device comprises a personal digital assistant.

17. The system of claim 14 wherein said input device comprises a laptop computer.

18. The system of claim 14, wherein said input device includes a wireless network interface and the network includes a wireless network portion; and wherein the wireless network interface and the wireless network portion are configured to communicate with each other.

19. The system of claim 18 wherein the wireless network interface and the wireless network portion are configured to communicate via WiFi.

20. The system of claim 14 wherein the input device comprises a plurality of input screens configured to receive the personal data from the applicant.

21. The system of claim 20 wherein at least a portion of the personal data received from the applicant is required.

22. The system of claim 14 wherein the input device is configured to encrypt data prior to transmission to said decision system.

23. The system of claim 14, wherein the payment card is activated for use at a single merchant located at the first site.

24. The system of claim 14 wherein the payment card is a temporary payment card.

25. The system of claim 24 wherein the decision system is configured to conduct further evaluation of the applicant to determine whether to issue a permanent payment card.

26. The system of claim 25 wherein based on a determination to issue the permanent payment card, the temporary payment card is changed into the permanent payment card.

27. The system of claim 25 wherein based on a determination to issue the permanent payment card, the temporary payment card is replaced by the permanent payment card.

* * * * *

UNITED STATES PATENT AND TRADEMARK OFFICE
CERTIFICATE OF CORRECTION

PATENT NO. : 7,668,777 B2 Page 1 of 1
APPLICATION NO. : 10/898518
DATED : February 23, 2010
INVENTOR(S) : White et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this

Seventh Day of December, 2010

David J. Kappos
*Director of the United States Patent and Trademark Office*